US007245465B2

(12) United States Patent
Hikita

(10) Patent No.: US 7,245,465 B2
(45) Date of Patent: Jul. 17, 2007

(54) VOLTAGE REGULATOR

(75) Inventor: Takahiro Hikita, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 208 days.

(21) Appl. No.: 10/308,066

(22) Filed: Dec. 3, 2002

(65) Prior Publication Data

US 2003/0122530 A1 Jul. 3, 2003

(30) Foreign Application Priority Data

Dec. 5, 2001 (JP) ............................ 2001-371514

(51) Int. Cl.
*H02H 7/85* (2006.01)
*H02H 9/00* (2006.01)
*H02H 9/02* (2006.01)

(52) U.S. Cl. ......................... 361/18; 361/93.9; 361/94; 361/87; 323/318; 323/349; 323/351; 323/352

(58) Field of Classification Search .................. 361/18, 361/93.9, 94, 87; 323/318, 349, 351, 352
See application file for complete search history.

(56) References Cited

U.S. PATENT DOCUMENTS 4,631,625 A * 12/1986 Alexander et al. ............ 361/94
5,258,721 A * 11/1993 Zanders ....................... 327/18
5,491,794 A * 2/1996 Wu ............................ 714/23
5,500,621 A * 3/1996 Katz et al. .................... 330/43
5,751,532 A * 5/1998 Kanuchok et al. ............ 361/94
6,425,086 B1 * 7/2002 Clark et al. ................. 713/322

* cited by examiner

*Primary Examiner*—Brian Sircus
*Assistant Examiner*—Zeev Kitov
(74) *Attorney, Agent, or Firm*—Morgan, Lewis & Bockius LLP

(57) ABSTRACT

A voltage regulator has an output circuit for producing from an input voltage a predetermined output voltage to be supplied to a load, an overcurrent protection circuit for preventing overcurrent in the output circuit, a memory for storing control information fed from outside, and an adjustment circuit for adjusting the level at which the overcurrent protection circuit detects overcurrent according to the control information read from the memory. With this configuration, it is possible to accurately detect overcurrent by canceling factors such as individual variations in the characteristics of the circuit components, the influence of stress occurring when the regulator IC is packaged, and fabrication-associated variations in the load.

2 Claims, 2 Drawing Sheets

VOLTAGE REGULATOR

BACKGROUND OF THE INVENTION

1. Field of the Invention

The present invention relates to a voltage regulator that produces from an input voltage a predetermined output voltage to be supplied to a load, and relates particularly to the optimization of an overcurrent protect circuit incorporated in such a voltage regulator.

2. Description of the Prior Art

FIG. 3 is a circuit diagram showing an example of the configuration of a conventional voltage regulator. The conventional regulator IC 1' shown in this figure is built by sealing into a single package an output circuit (a P-channel MOS transistor P1, an operational amplifier OP1, a direct-current voltage source E1, and resistors R1 and R2) for producing from an input voltage Vi a predetermined output voltage Vo to be supplied to a load Z1 and an overcurrent protection circuit (a P-channel MOS transistor P2, a resistor R3, and an N-channel MOS transistor N1) for preventing overcurrent in the output circuit.

It is true that, in the regulator IC 1' configured as described above, the predetermined output voltage Vo produced from the input voltage Vi is supplied to the load Z1 connected externally to the output terminal of the regulator IC 1'. Moreover, the overcurrent protection circuit prevents the output current Io from reaching the capacity limit of the transistor P1 even when, as immediately after electric power starts being supplied to the regulator IC 1', the output current Io flows at a dash into a bypass capacitor C1.

However, in the conventional regulator IC 1', the level at which the overcurrent protection circuit detects overcurrent is fixed at the time of the fabrication of the circuit. This makes it impossible to cancel factors such as individual variations in the characteristics of the circuit components, the influence of stress occurring when the regulator IC 1' is packaged or mounted on a circuit board, and fabrication-associated variations in the load Z1 connected to the regulator IC 1'.

Thus, in the conventional regulator IC 1', the level at which to detect overcurrent is set rather high (generally 1.5 times or more as high as the upper limit of the actually used range of the output current Io, see FIG. 4) with a margin secured so that the level at which to detect overcurrent does not happen to be lower than the upper limit of the actually used range of the output current Io.

As a result, with the overcurrent protection circuit mentioned above, it is possible to prevent the output current lo from reaching the capacity limit of the transistor P1 when, as immediately after electric power starts being-supplied to the regulator IC 1', the output current Io flows at a dash into the bypass capacitor C1, but this is achieved at the cost of unnecessarily great power loss as indicated by hatching in FIG. 4.

Moreover, in anticipation of such power loss, the regulator IC 1' needs to be supplied with electric power from a power supply device with a rather high power supply capacity. This increases the size and cost of the power supply device.

Incidentally, there is available a regulator IC (not shown) having a sense resistor, for detecting the output current, connected outside the IC so that overcurrent is prevented on the basis of the voltage across the sense resistor. With this type of regulator IC, by setting the resistance of the sense resistor appropriately, it is possible to vary the level at which to detect overcurrent. This apparently helps solve the problem described above. In reality, however, the sense resistor has a very low resistance, and thus tends to be influenced by variations in connection resistances and other factors. Thus, the sense resistor is difficult to match with the circuit components within the IC. This makes it extremely difficult to satisfactorily correct for a variation in the level at which to detect overcurrent.

As a result, even in the regulator IC configured as described above, the level at which to detect overcurrent needs to be set rather high with a margin secured so that the level at which to detect overcurrent does not happen to be lower than the upper limit of the actually used range of the output current. Thus, it is not possible to satisfactorily solve the problem described above. In addition, the sense resistor, connected externally, hampers the scaling-down and cost reduction of the appliance incorporating the regulator IC.

SUMMARY OF THE INVENTION

An object of the present invention is to provide a voltage regulator that can accurately detect overcurrent without unnecessary power loss by canceling factors such as individual variations in the characteristics of the circuit components, the influence of stress occurring when the regulator IC is packaged or mounted on a circuit board, and fabrication-associated variations in the load.

To achieve the above object, according to the present invention, a voltage regulator is provided with an output circuit for producing from an input voltage a predetermined output voltage to be supplied to a load, an overcurrent protection circuit for preventing the output current of the output circuit from going into an overcurrent state, a storage circuit for storing control information, and an adjustment circuit for adjusting the level at which the overcurrent protection circuit detects overcurrent according to the control information read from the storage circuit. Here, the control information is fed from outside.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
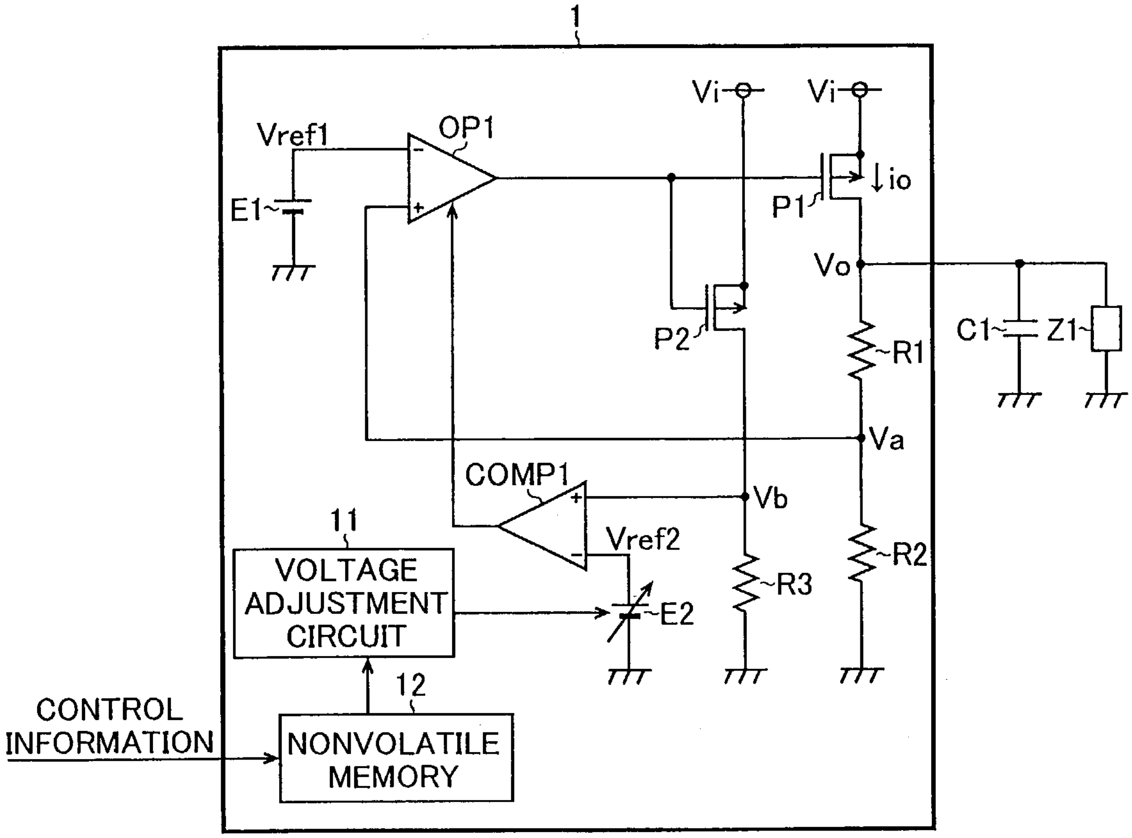
FIG. 1 is a circuit diagram showing an example of a voltage regulator embodying the invention.

FIG. 1 is a circuit diagram showing an example of a voltage regulator embodying the invention. The regulator IC 1 of this embodiment is built by sealing into a single package an output circuit (a P-channel MOS transistor P1, an operational amplifier OP1, a direct-current voltage source E1, and resistors R1 and R2) for producing from an input voltage Vi (supply voltage Vi) a predetermined output voltage Vo to be supplied to a load Z1, an overcurrent protection circuit (a P-channel MOS transistor P2, a resistor R3, a comparator COMP1, and a variable direct-current voltage source E2) for preventing overcurrent in the output circuit, a voltage adjustment circuit 11 for adjusting the level of the direct-current voltage generated by the variable direct-current voltage source E2 (i.e. the level at which the overcurrent protection circuit detects overcurrent), and a nonvolatile memory 12 (for example, a flash memory) for storing control information fed from outside.

The source of the transistor P1 is connected to the supply voltage line, and the drain of the transistor P1 is grounded through the resistors R1 and R2. The drain of the transistor P1 serves as the output terminal of the regulator IC 1, and, to this drain, a bypass capacitor C1 and the load Z1 are connected externally. The gate of the transistor P1 is connected to the output terminal of the operational amplifier OP1. The non-inverting input terminal of the operational amplifier OP1 is connected to the node between the resistors R1 and R2, and the inverting input terminal of the operational amplifier OP1 is connected to the direct-current voltage source E1.

To the output terminal of the operational amplifier OP1 is connected not only the transistor P1 mentioned above but also the gate of the transistor P2 included in the overcurrent protection circuit. The source of the transistor P2 is connected to the supply voltage line, and the drain of the transistor P2 is grounded through the resistor R3. The node between the drain of the transistor P2 and the resistor R3 is connected to the non-inverting input terminal of the comparator COMP1, and the inverting input terminal of the comparator COMP1 is connected to the variable direct-current voltage source E2. The output terminal of the comparator COMP1 is connected to the gain control terminal of the operational amplifier OP1.

In the output circuit of the regulator IC 1 configured as described above, feedback control is performed on the output voltage Vo by the operational amplifier OP1 and the transistor P1 so that the reference voltage Va obtained by dividing the output voltage Vo with the resistors R1 and R2 is kept equal to the fixed reference voltage Vref1 generated by the direct-current voltage source E1. With this configuration, the predetermined output voltage Vo produced from the input voltage Vi is supplied to the load Z1 externally connected to the output terminal of the regulator IC 1 (i.e., the drain of the transistor P1). The noise superimposed on the output voltage Vo is eliminated by the bypass capacitor C1 connected in parallel with the load Z1.

On the other hand, in the overcurrent protection circuit of the regulator IC 1 configured as described above, the gain of the operational amplifier OP1 is controlled by the comparator COMP1 so that the reference voltage Vb (the voltage across the resistor R3) that varies according to the output current Io does not become higher than the variable reference voltage Vref2 generated by the variable direct-current voltage source E2. With this configuration, it is possible to prevent the output current Io from reaching the capacity limit of the transistor P1 even when, as immediately after electric power starts being supplied to the regulator IC 1, the output current Io flows at a dash into the bypass capacitor C1.

Here, the voltage adjustment circuit 11 of this embodiment can adjust the variable reference voltage Vref2 (i.e. the level at which the overcurrent protection circuit detects overcurrent) generated by the variable direct-current voltage source E2 according to the control information read from the nonvolatile memory 12. With this configuration, in the regulator IC 1 of this embodiment, even after the regulator IC 1 is packaged or amounted on a circuit board, or after the load Z1 is connected, it is possible, by rewriting what is stored in the nonvolatile memory 12, to easily adjust the level at which to detect overcurrent.

Thus, by configuring a process so that, after the regulator IC 1 is connected to the load Z1, control information is written to the nonvolatile memory 12, it is possible to optimize the level at which to detect overcurrent (to within 1.1 times or less as wide as the actually used range of the output current Io) by canceling all such factors as individual variations in the characteristics of the circuit components, the influence of stress occurring when the regulator IC 1 is packaged or mounted on a circuit board, and fabrication-associated variations in the load Z1 connected to the regulator IC 1.

Figure 2:
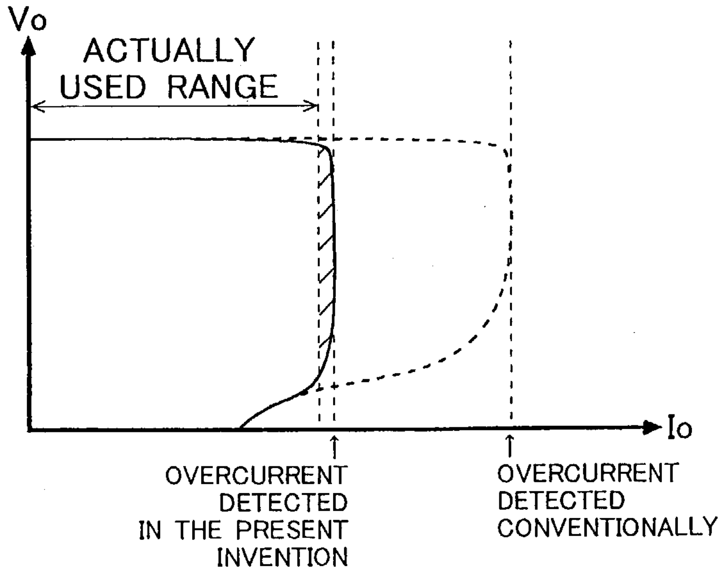
FIG. 2 is a load characteristic curve showing the correlation between the output current Io and the output voltage Vo as observed in this embodiment.
Figure 3:
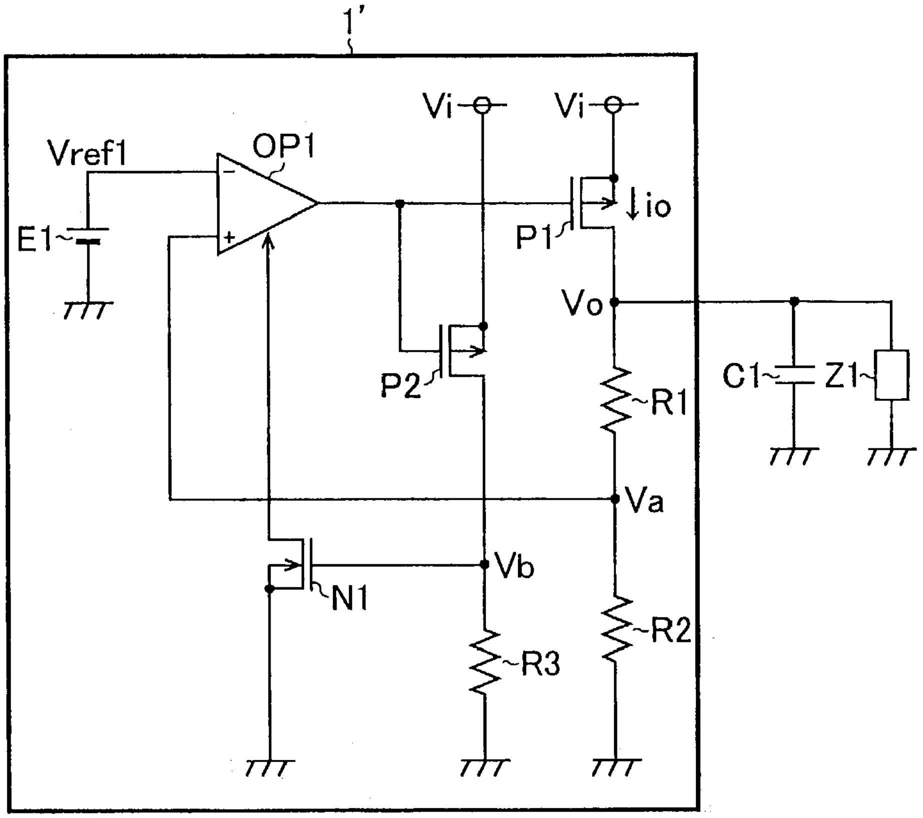
Fig. 3 Prior Art
FIG. 3 is a circuit diagram showing an example of a conventional voltage regulator.
Figure 4:
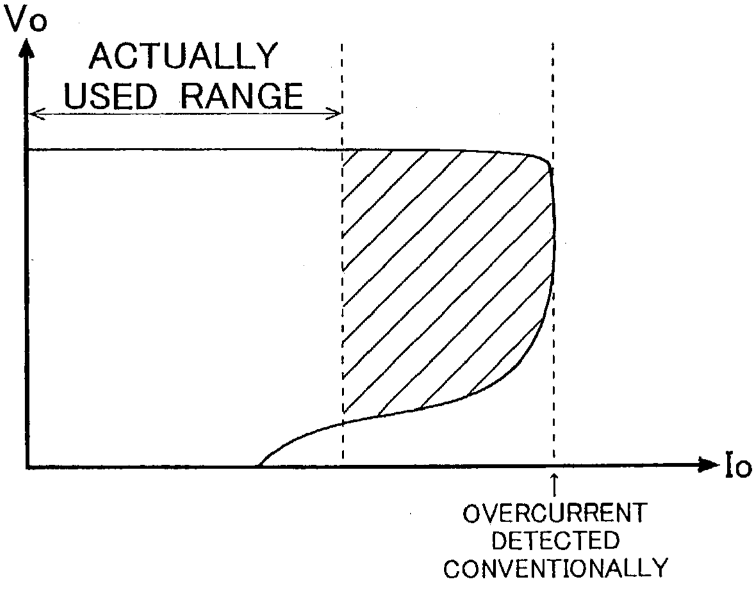
Fig. 4 Prior Art
FIG. 4 is a load characteristic curve showing the correlation between the output current Io and the output voltage Vo as observed conventionally.

FIG. 2 is a load characteristic curve showing the correlation between the output current Io and the output voltage Vo as observed in this embodiment. Along the horizontal axis is taken the output current Io, and along the vertical axis is taken the output voltage Vo. In the figure, the solid line represents the load characteristic curve observed in this embodiment, and the broken line represents, for comparison, the load characteristic curve observed conventionally.

As described above, with the regulator IC 1 of this embodiment, compared with the conventional one, it is possible to greatly reduce variation in the level at which to detect overcurrent. This eliminates the need to set the level at which to detect overcurrent unnecessarily high. As a result, it is possible to minimize the unnecessary power loss occurring when, for example, electric power starts being supplied to the regulator IC 1. Moreover, it is not necessary, either, to feed electric power to the regulator IC 1 from a power supply device (not shown) with a rather high power supply capacity. This contributes to the miniaturization and cost reduction of the power supply device.

In the regulator IC 1 of this embodiment, the nonvolatile memory 12 is used as a medium for recording the control information. Instead, a fuse or the like may be used. With this configuration, even if the supply of electric power to the regulator IC 1 is cut, what is stored in it remains safe. Therefore, once the level at which to detect overcurrent is optimized, there is no need any longer to write control information to the nonvolatile memory 12 again. Mounting the nonvolatile memory 12 on the regulator IC 1 in a chip-on-chip fashion helps minimize the numbers of circuit boards and of terminals.

Moreover, adopting the regulator IC 1 of this embodiment eliminates the need to externally connect a sense resistor for detecting the output current. This contributes to the scaling-down and cost reduction of the appliance incorporating the regulator IC.

As described above, according to the present invention, a voltage regulator is provided with an output circuit for producing from an input voltage a predetermined output voltage to be supplied to a load, an overcurrent protection circuit for preventing overcurrent in the output circuit, a storage circuit for storing control information fed from outside, and an adjustment circuit for adjusting the level at which the overcurrent protection circuit detects overcurrent according to the control information read from the storage circuit.

With this configuration, it is possible to programmably adjust the level at which to detect overcurrent according to control information fed from outside. This makes it possible to realize a regulator that can accurately detect overcurrent by canceling factors such as individual variations in the characteristics of the circuit components, the influence of stress occurring when the regulator IC is packaged, and fabrication-associated variations in the load. As a result, it is possible not only to reduce the unnecessary power loss occurring when, for example, electric power starts being supplied to the regulator but also achieve the miniaturization and cost reduction of the power supply device that supplies electric power to the regulator.

What is claimed is:

1. A voltage regulator comprising:

an output circuit for producing from an input voltage a predetermined output voltage to be supplied to a load, the output circuit comprising:

a transistor including:

a terminal at which the transistor receives the input voltage and a terminal at which the transistor outputs the output voltage; and an operational amplifier outputting a voltage produced by amplifying a differential voltage between a first reference voltage commensurate with the output voltage and a fixed voltage generated by a fixed reference voltage source and controlling the transistor based on the thus outputted voltage;

a current detection circuit for detecting an output current commensurate with a current flowing through the load, the current detection circuit comprising:

a variable reference voltage source; and a comparator comparing a second reference voltage generated to be commensurate with the output current with a variable reference voltage generated by the variable reference voltage source, and controlling a gain of the operational amplifier so that the second reference voltage does not become higher than the variable reference voltage;

a nonvolatile memory for storing control information according to the variable reference voltage source; and an adjustment circuit for controlling the variable reference voltage source according to the control information read from the nonvolatile memory, and wherein the output circuit, the current detection circuit, the nonvolatile memory and the adjustment circuit are all sealed in a single package, and the control information is fed to the nonvolatile memory from outside the single package.

2. A voltage regulator as claimed in claim 1, wherein the level at which the current detection circuit detects a current is set equal to 1.1 times or less as high as a level of an actually used current.

* * * * *